(12) United States Patent
Chino et al.

(10) Patent No.: US 11,952,483 B2
(45) Date of Patent: Apr. 9, 2024

(54) RESIN COMPOSITION

(71) Applicant: ENEOS CORPORATION, Tokyo (JP)

(72) Inventors: Keisuke Chino, Tokyo (JP); Yoshihiro Morinaga, Tokyo (JP); Yuhei Sasaki, Tokyo (JP); Takafumi Ishii, Tokyo (JP); Toshiyuki Iwasaki, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 628 days.

(21) Appl. No.: 17/263,737

(22) PCT Filed: Jul. 30, 2019

(86) PCT No.: PCT/JP2019/029788
§ 371 (c)(1),
(2) Date: Jan. 27, 2021

(87) PCT Pub. No.: WO2020/027109
PCT Pub. Date: Feb. 6, 2020

(65) Prior Publication Data
US 2021/0371635 A1 Dec. 2, 2021

(30) Foreign Application Priority Data

Jul. 30, 2018 (JP) ................................ 2018-142527

(51) Int. Cl.
C08L 23/26 (2006.01)
(52) U.S. Cl.
CPC ......... *C08L 23/26* (2013.01); *C08L 2207/062* (2013.01); *C08L 2312/00* (2013.01)
(58) Field of Classification Search
CPC ...... C08L 23/26; C08L 2207/04; C08L 51/06; C08L 2312/00; C08L 2207/062; C08K 5/0025
USPC ....................................................... 525/194
See application file for complete search history.

(56) References Cited

U.S. PATENT DOCUMENTS

| 2002/0086952 A1 | 7/2002 | Chino et al. |
| 2006/0094829 A1 | 5/2006 | Chino et al. |
| 2008/0045665 A1 | 2/2008 | Chino |
| 2019/0119471 A1 | 4/2019 | Chino et al. |

FOREIGN PATENT DOCUMENTS

| JP | 2000-169527 A | 6/2000 |
| JP | 2002-060601 A | 2/2002 |
| JP | 2002-146169 A | 5/2002 |
| JP | 2002-201265 A | 7/2002 |
| JP | 2006-131663 A | 5/2006 |
| JP | 2007-291301 A | 11/2007 |
| JP | 2008-88194 A | 4/2008 |
| JP | 2008-260887 A | 10/2008 |
| JP | 2016-194072 A | 11/2016 |
| JP | 2017-57393 A | 3/2017 |
| WO | 2017/199806 A1 | 11/2017 |
| WO | 2018/235961 A1 | 12/2018 |
| WO | 2019/027022 A1 | 2/2019 |

OTHER PUBLICATIONS

Mar. 29, 2023 Office Action Issued in Japanese Patent Application No. 2020-534659.
Oct. 21, 2019 International Search Report issued in International Patent Application No. PCT/JP2019/029788.
Nov. 23, 2022 Chinese Office Action issued in Chinese Patent Application No. 201980047396.6.
Jun. 7, 2023 Office Action Issued in European Patent Application No. 19843820.2.

*Primary Examiner* — Fred M Teskin
(74) *Attorney, Agent, or Firm* — Oliff PLC

(57) ABSTRACT

A resin composition including: at least one resin ingredient selected from the group made of a resin (A) having a side chain (a) containing a hydrogen-bonding cross-linking moiety with a carbonyl-containing group and/or a nitrogen-containing heterocycle and having a glass transition point of 25° C. or lower, and a resin (B) containing a hydrogen-bonding cross-linking moiety and a covalent-bonding cross-linking moiety in a side chain and having a glass transition point of 25° C. or lower, wherein both the resin (A) and the resin (B) are a reaction product of a cross-linking agent with a maleic anhydride-modified thermoplastic resin having a melting point of 68° C. to 134° C. and a maleation rate of 0.5 to 2.5% by mass.

4 Claims, No Drawings

RESIN COMPOSITION

TECHNICAL FIELD

The present invention relates to a resin composition.

BACKGROUND ART

Conventionally, in the field of resin compositions, various resins have been studied in order to exhibit characteristics according to the application. For example, Japanese Unexamined Patent Application Publication No. 2002-60601 (PTL 1) discloses a polyester resin composition comprising: (A) a thermoplastic polyester resin having a functional group acting as a hydrogen bond donor; and (B) a compound having two or more functional groups in a molecule acting as a hydrogen bond acceptor. In addition, Japanese Unexamined Patent Application Publication No. 2002-146169 (PTL 2) discloses a polyester resin composition comprising: (A) a thermoplastic polyester resin having a functional group other than a carbonyl group that acts as a hydrogen bond acceptor; and (B) a compound having two or more functional groups in a molecule that act as hydrogen bond donors. In addition, Japanese Unexamined Patent Application Publication No. 2002-201265 (PTL 3) discloses a thermoplastic resin comprising: a specific secondary amino group in the main chain and/or a specific primary amino group at the end; and a functional group that acts as a hydrogen bond donor other than the secondary amino group and the primary amino group. Moreover, Japanese Unexamined Patent Application Publication No. 2000-169527 (PTL 4) discloses a thermoplastic resin obtained by reacting a plastic polymer having a cyclic acid anhydride group in the side chain and a heterocyclic amine-containing compound at a temperature at which the heterocyclic amine-containing compound can chemically bond with the cyclic acid anhydride group, and as a demonstrative example thereof, the thermoplastic resin obtained by reacting maleic anhydride-modified polypropylene (manufactured by Sanyo Chemical Industries, Ltd. under the trade name of "UMEX 1010") with 3-amino-1,2,4-triazole in Examples 6 to 8 is disclosed. However, conventional resins as described in PTLs 1 to 4 or compositions using them cannot be sufficiently good both in resistance to compression set and fluidity at the same time, and these characteristics cannot be compatible with each other.

CITATION LIST

Patent Literature

[PTL 1] Japanese Unexamined Patent Application Publication No. 2002-60601
[PTL 2] Japanese Unexamined Patent Application Publication No. 2002-146169
[PTL 3] Japanese Unexamined Patent Application Publication No. 2002-201265
[PTL 4] Japanese Unexamined Patent Application Publication No. 2000-169527

SUMMARY OF INVENTION

Technical Problem

The present invention has been made in view of the above-mentioned problems of the related art, and an object thereof is to provide a resin composition capable of achieving both two sufficiently good characteristics of resistance to compression set and fluidity.

Solution to Problem

The present inventors made earnest studies to achieve the above object, and have found as a result that it is possible to achieve both two sufficiently good characteristics of resistance to compression set and fluidity when the resin composition contains at least one resin ingredient selected from the group consisting of a resin (A) having a side chain (a) containing a hydrogen-bonding cross-linking moiety with a carbonyl-containing group and/or a nitrogen-containing heterocycle and having a glass transition point of 25° C. or lower, and a resin (B) containing a hydrogen-bonding cross-linking moiety and a covalent-bonding cross-linking moiety in a side chain and having a glass transition point of 25° C. or lower, and both the resin (A) and the resin (B) are a reaction product of a cross-linking agent with a maleic anhydride-modified thermoplastic resin having a melting point of 68° C. to 134° C. and a maleation rate of 0.5 to 2.5% by mass. Thus, the present invention has been completed.

Specifically, a resin composition of the present invention comprises: at least one resin ingredient selected from the group consisting of a resin (A) having a side chain (a) containing a hydrogen-bonding cross-linking moiety with a carbonyl-containing group and/or a nitrogen-containing heterocycle and having a glass transition point of 25° C. or lower, and a resin (B) containing a hydrogen-bonding cross-linking moiety and a covalent-bonding cross-linking moiety in a side chain and having a glass transition point of 25° C. or lower, wherein both the resin (A) and the resin (B) are a reaction product of a cross-linking agent with a maleic anhydride-modified thermoplastic resin having a melting point of 68° C. to 134° C. and a maleation rate of 0.5 to 2.5% by mass.

Advantageous Effects of Invention

The present invention makes it possible to provide a resin composition capable of achieving both two sufficiently good characteristics of resistance to compression set and fluidity.

DESCRIPTION OF EMBODIMENTS

Hereinafter, the present invention is described in detail according to its preferable embodiment.

A resin composition of the present invention comprises: at least one resin ingredient selected from the group consisting of the resin (A) and the resin (B), wherein both the resin (A) and the resin (B) are a reaction product of a cross-linking agent with a maleic anhydride-modified thermoplastic resin having a melting point of 68° C. to 134° C. and a maleation rate of 0.5 to 2.5% by mass.

The resin ingredient according to the present invention is at least one resin selected from the group consisting of a resin (A) having a side chain (a) containing a hydrogen-bonding cross-linking moiety with a carbonyl-containing group and/or a nitrogen-containing heterocycle and having a glass transition point of 25° C. or lower, and a resin (B) containing a hydrogen-bonding cross-linking moiety and a covalent-bonding cross-linking moiety in a side chain and having a glass transition point of 25° C. or lower. In the resins (A) and (B), the "side chain" refers to the side chain and the end of the resin. In addition, the "side chain (a) containing a hydrogen-bonding cross-linking moiety with a carbonyl-containing group and/or a nitrogen-containing heterocycle" means that the carbonyl-containing group and/or the nitrogen-containing heterocycle (more preferably the carbonyl-containing group and the nitrogen-containing heterocycle) as a hydrogen-bonding cross-linking moiety has a chemically stable bond (covalent bond) to the atom (usually a carbon atom) forming the main chain of the resin. In addition, "containing a hydrogen-bonding cross-linking moiety and a covalent-bonding cross-linking moiety in a side chain" is a concept including the case of containing both the hydrogen-bonding cross-linking moiety and the covalent-bonding cross-linking moiety in the side chain of the resin by containing both side chains of a side chain having the hydrogen-bonding cross-linking moiety (hereinafter sometimes referred to as "side chain (a')" for convenience) and a side chain having the covalent-bonding cross-linking moiety (hereinafter sometimes referred to as "side chain (b)" for convenience) as well as the case of containing both the hydrogen-bonding cross-linking moiety and the covalent-bonding cross-linking moiety in the side chain of the resin by containing a side chain having both the hydrogen-bonding cross-linking moiety and the covalent-bonding cross-linking moiety (side chain containing both the hydrogen-bonding cross-linking moiety and the covalent-bonding cross-linking moiety in one side chain: hereinafter, such a side chain is sometimes referred to as "side chains (c)" for convenience).

In addition, from the viewpoint of improving stretchability, the resin ingredient is more preferably at least one selected from the group consisting of a resin (B) containing a hydrogen-bonding cross-linking moiety and a covalent-bonding cross-linking moiety in a side chain and having a glass transition point of 25° C. or lower. Since the resins (A) and (B) are a reaction product of a cross-linking agent with a maleic anhydride-modified thermoplastic resin, the main chain of the resins (A) and (B) in the resin ingredient (the type of polymer (resin) forming the main chain portion) is derived from the main chain of the maleic anhydride-modified thermoplastic resin. Not that the thermoplastic resin that forms the main chain portion of the resins (A) and (B) (main chain of the maleic anhydride-modified thermoplastic resin) is described later.

In addition, the glass transition points of the resins (A) and (B) are all 25° C. or lower as described above. In the present invention, the "glass transition point" is a glass transition point measured by differential scanning calorimetry (DSC). Note that, in the measurement, the rate of temperature rise is set to 10° C./min to carry out measurement. By setting the glass transition point of the resin to 25° C. or lower, it is possible to impart flexibility in a normal operating temperature range (room temperature (25° C.) or higher).

In addition, as described above, the resins (A) and (B) have as a side chain at least one of a side chain (a) containing a hydrogen-bonding cross-linking moiety with a carbonyl-containing group and/or a nitrogen-containing heterocycle; a side chain (a') containing a hydrogen-bonding cross-linking moiety and a side chain (b) containing a covalent-bonding cross-linking moiety; and a side chain (c) containing a hydrogen-bonding cross-linking moiety and a covalent-bonding cross-linking moiety. Note that in the present invention, it can be said that the side chain (c) is a side chain that also functions as the side chain (b) while also functioning as the side chain (a'). Each side chain is described later.

Side Chain (a'): Side Chain Containing Hydrogen-Bonding Cross-Linking Moiety

The side chain (a') containing a hydrogen-bonding cross-linking moiety may be a side chain that has a group capable of forming a hydrogen bond-based cross-link (such as a hydroxyl group or a hydrogen-bonding cross-linking moiety contained in the side chain (a) described later), and forms a hydrogen bond based on the group, and the structure thereof is not particularly limited. Here, the hydrogen-bonding cross-linking moiety is a moiety that cross-links the molecules of the resin by hydrogen bonding. Note that cross-links by hydrogen bonding are formed only when there is a hydrogen acceptor (such as a group containing an atom containing a lone electron pair) and a hydrogen donor (such as a group having a hydrogen atom covalently bonded to an atom with high electronegativity). For this reason, in the absence of both hydrogen acceptor and hydrogen donor between the side chains of the resin molecules, a cross-link by hydrogen bonding is not formed. Therefore, a hydrogen-bonding cross-linking moiety exists in the system only when both a hydrogen acceptor and a hydrogen donor are present between the side chains of the resin molecules. Note that, in the present invention, the portion of the side chain that can function as a hydrogen acceptor and the portion that can function as a donor can be determined as a hydrogen-bonding cross-linking moiety based on the presence of both a portion capable of functioning as a hydrogen acceptor (such as a carbonyl group) and a portion capable of functioning as a hydrogen donor (such as a hydroxyl group) between the side chains of the resin molecules.

As the hydrogen-bonding cross-linking moiety in the side chain (a'), the side chain (a) described later is more preferable from the viewpoint of forming a stronger hydrogen bond. In addition, from the same viewpoint, the hydrogen-bonding cross-linking moiety in the side chain (a') is more preferably a hydrogen-bonding cross-linking moiety having a carbonyl-containing group and a nitrogen-containing heterocycle.

Side Chain (a): Side Chain Containing Hydrogen-Bonding Cross-Linking Moiety with Carbonyl-Containing Group and/or Nitrogen-Containing Heterocycle The side chain (a) containing a hydrogen-bonding cross-linking moiety with a carbonyl-containing group and/or a nitrogen-containing heterocycle may be one that has a carbonyl-containing group and/or a nitrogen-containing heterocycle, and other configurations are not particularly limited. As the hydrogen-bonding cross-linking moiety, those having a carbonyl-containing group and a nitrogen-containing heterocycle are more preferable.

The carbonyl-containing group may be one that contains a carbonyl group, and is not particularly limited, and specific examples thereof include amides, esters, imides, carboxy groups, carbonyl groups, and thioester groups. Note that, in the present invention, both the resins (A) and (B) are a reaction product of a cross-linking agent with a maleic anhydride-modified thermoplastic resin, and thus have a group derived from the "maleic anhydride group" of the maleic anhydride-modified thermoplastic resin (such as an ester group, a carbonyl group, an amide group, an imide group, a carboxy group, and the like, although it depends on the type of the cross-linking agent reacted).

In addition, when the side chain (a) has a nitrogen-containing heterocycle, the nitrogen-containing heterocycle may be introduced into the side chain (a) directly or via an organic group, and its configuration or the like is not particularly limited. As the nitrogen-containing heterocycle, as long as the heterocycle contains a nitrogen atom, it is possible to use one whose heterocycle has a hetero atom other than a nitrogen atom, for example, a sulfur atom, an oxygen atom, a phosphorus atom, or the like. Note that the nitrogen-containing heterocycle may have a substituent. Here, using a nitrogen-containing heterocycle in the side chain (a) is preferable because the hydrogen bond forming a cross-link becomes stronger due to the heterocyclic structure, and the stretchability and impact resistance of the resin composition are further improved. In addition, the nitrogen-containing heterocycle is preferably a 5-membered ring and/or a 6-membered ring from the viewpoint that the hydrogen bond becomes stronger, and the compression set and the mechanical strength are further improved. In addition, as the nitrogen-containing heterocycle, a nitrogen-containing heterocycle may be condensed with a benzene ring, or nitrogen-containing heterocycles may be condensed with each other. As the nitrogen-containing heterocycle, it is possible to appropriately use known ones (such as one described in paragraphs [0054] to [0067] of Japanese Patent No. 5918878, and one described in paragraphs [0035] to [0048] of Japanese Unexamined Patent Application Publication No. 2017-206604). Note that the nitrogen-containing heterocycle may have a substituent. Examples of the nitrogen-containing heterocycle include pyrroloine, pyrrolidone, oxindole (2-oxyindole), indoxyl (3-oxyindole), dioxyindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine, cinnoline, pyrrole, pyrroline, indole, indoline, oxylindole, carbazole, phenothiazine, indolenine, isoindole, oxazole, thiazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisoxazole, anthranil, benzothiazole, benzofurazan, pyridine, quinoline, isoquinoline, acridine, phenanthridine, anthrazoline, naphthyridine, thiazine, pyridazine, pyrimidine, quinazoline, quinoxaline, triazine, histidine, triazolidine, melamine, adenine, guanine, thymine, cytosine, hydroxyethyl isocyanurate, and derivatives thereof.

From the viewpoint of good recyclability, compression set, hardness, and mechanical strength (especially tensile strength), the nitrogen-containing heterocycle is preferably at least one selected from a triazole ring, an isocyanurate ring, a thiadiazole ring, a pyridine ring, an imidazole ring, a triazine ring, and a hydantoin ring, each of which may have a substituent, and preferably at least one selected from a triazole ring, a thiadiazole ring, a pyridine ring, an imidazole ring, and a hydantoin ring, each of which may have a substituent.

Examples of the substituent that the nitrogen-containing heterocycle may have include a hydroxyl group, an amino group, an imino group, a carboxy group, an isocyanate group, an epoxy group, an alkoxysilyl group, and a thiol group (mercapto group). In addition, as the substituent, it is possible to use an alkyl group such as a methyl group, an ethyl group, an (iso) propyl group, or a hexyl group; an alkoxy group such as a methoxy group, an ethoxy group, or an (iso) propoxy group; a group made up of a halogen atom such as a fluorine atom, a chlorine atom, a bromine atom, or an iodine atom; a cyan group; an amino group; an imino group; an aromatic hydrocarbon group; an ester group; an ether group; an acyl group; a thioether group; or the like. In addition, the substitution positions of these substituents are not particularly limited, and the number of substituents is not limited either.

In addition, when both the carbonyl-containing group and the nitrogen-containing heterocycle are contained in the side chain (a), the carbonyl-containing group and the nitrogen-containing heterocycle may be introduced into the main chain as side chains independent of each other, but are preferably introduced into the main chain as one side chain in which the carbonyl-containing group and the nitrogen-containing heterocycle are bonded via different groups. The structure of the side chain (a) may be, for example, a structure as described in paragraphs [0068] to [0081] of JP 5918878 B.

In addition, the side chain (a) is formed by a reaction between a maleic anhydride-modified thermoplastic resin and a cross-linking agent. As a cross-linking agent used when forming the side chain (a), it is possible to preferably use a compound capable of reacting with a maleic anhydride group to form a hydrogen-bonding cross-linking moiety (hereinafter simply referred to as a "compound that forms a hydrogen-bonding cross-linking moiety" in some cases). As the "compound that forms a hydrogen-bonding cross-linking moiety" which can be used as a cross-linking agent, it is possible to preferably use a compound capable of introducing a nitrogen-containing heterocycle. As described above, as the cross-linking agent, it is possible to preferably use the "compound that forms a hydrogen-bonding cross-linking moiety (more preferably a compound capable of introducing a nitrogen-containing heterocycle)." For example, the "compound that forms a hydrogen-bonding cross-linking moiety (more preferably a compound capable of introducing a nitrogen-containing heterocycle)" is preferably a compound having a substituent that reacts with a maleic anhydride group (such as a hydroxyl group, a thiol group, an amino group, or an imino group), and more preferably a compound having at least one of a hydroxyl group, an amino group, an imino group, and a thiol group. In addition, the compound having a substituent that reacts with a maleic anhydride group (more preferably a compound having at least one of a hydroxyl group, an amino group, an imino group, and a thiol group) particularly preferably has a nitrogen-containing heterocycle.

Side Chain (b): Side Chain Containing Covalent-Bonding Cross-Linking Moiety

In the present specification, the "side chain (b) containing a covalent-bonding cross-linking moiety" means a side chain containing a portion in which the molecules of the resin forming the main chain are cross-linked by covalent bonds (covalent-bonding cross-linking moiety: for example, a portion that can be formed by reacting a maleic anhydride group with a cross-linking agent and that cross-links polymers by a chemically stable bond (covalent bond) such as at least one bond selected from the group consisting of amides, esters, and thioesters). Note that the side chain (b) is a side chain containing a covalent-bonding cross-linking moiety, but is used as the side chain (c) described later when it has a covalent bond moiety and also has a group capable of hydrogen bonding to form a cross-link by hydrogen bonding between side chains (note that, in the absence of both a hydrogen donor and a hydrogen acceptor capable of forming a hydrogen bond between the side chains of the resin molecules, for example in the presence of only a side chain containing ester groups (—COO—) in the system, no hydrogen bond is particularly formed between the ester groups (—COO—), and thus the groups do not function as a hydrogen-bonding cross-linking moiety. On the other hand, when a structure, having both a hydrogen acceptor portion and a hydrogen donor portion for hydrogen bond such as a carboxy group and a triazole ring, is contained in the side chains of the resin molecules, hydrogen bonds are formed between the side chains of the resin molecules, and thus a hydrogen-bonding cross-linking moiety is contained. In addition, for example, when an ester group and a hydroxyl group coexist between the side chains of the resin molecules, and these groups contribute to the formation of a hydrogen bond between the side chains, the portion where the hydrogen bond is formed becomes the hydrogen-bonding cross-linking moiety. Therefore, it may be used as the side chain (c) depending on the structure itself of the side chain (b), the type of the structure of the side chain (b) and the substituents of the other side chains, and the like.). In addition, the "covalent-bonding cross-linking moiety" mentioned here is a portion that cross-links resin molecules by covalent bonding.

The side chain (b) containing a covalent-bonding cross-linking moiety is not particularly limited, but is preferably, for example, a side chain containing a covalent-bonding cross-linking moiety which is formed by reacting a maleic anhydride-modified thermoplastic resin; and a cross-linking agent made up of a compound capable of reacting with a maleic anhydride group (functional group) to form a covalent-bonding cross-linking moiety (hereinafter referred to as a "compound that forms a covalent-bonding cross-linking moiety (compound that forms a covalent bond)" in some cases). The cross-linking of the side chain (b) at the covalent-bonding cross-linking moiety is preferably formed by at least one bond selected from the group consisting of amides, esters, and thioesters.

The "compound that forms a covalent-bonding cross-linking moiety (compound that forms a covalent bond)" which can be used as a cross-linking agent is preferably a compound having a substituent that reacts with a maleic anhydride group (such as a hydroxyl group, a thiol group, an amino group, or an imino group), and more preferably a compound having at least one of a hydroxyl group, an amino group, and an imino group. In addition, it is particularly preferable that the compound having a substituent that reacts with such a maleic anhydride group (more preferably a compound having at least one of a hydroxyl group, an amino group, and an imino group) has a nitrogen-containing heterocycle.

In addition, examples of the "compound that forms a covalent-bonding cross-linking moiety (compound that forms a covalent bond)" which can be used as a cross-linking agent include a polyamine compound having two or more amino groups and/or imino groups in one molecule (in the case of having both amino groups and imino groups, a total of two or more of these groups); a polyol compound having two or more hydroxyl groups in one molecule; a polyisocyanate compound having two or more isocyanate (NCO) groups in one molecule; and a polythiol compound having two or more thiol groups (mercapto groups) in one molecule. Here, the "compound that forms a covalent-bonding cross-linking moiety (compound that forms a covalent bond)" can be a compound capable of introducing both the hydrogen-bonding cross-linking moiety and the covalent-bonding cross-linking moiety depending on the type of substituents of the compound, the degree of progress of the reaction when the reaction is carried out using the compound, and the like (for example, when a compound having three or more hydroxyl groups is used as a cross-linking agent to form a cross-linking moiety by a covalent bond, there may be a case where two hydroxyl groups react with the functional group (maleic anhydride group) of the maleic anhydride-modified thermoplastic resin, and the remaining one hydroxyl group remains as a hydroxyl group depending on the degree of progress of the reaction, and in that case, a moiety that forms a hydrogen-bonding cross-link can also be introduced). Therefore, the "compound that forms a covalent-bonding cross-linking moiety (compound that forms a covalent bond)" exemplified here may also include a "compound that forms both a hydrogen-bonding cross-linking moiety and a covalent-bonding cross-linking moiety." From this viewpoint, in the case of forming the side chain (b), the side chain (b) may be formed by appropriately selecting a compound from the "compound that forms a covalent-bonding cross-linking moiety (compound that forms a covalent bond)" according to the desired design, appropriately controlling the degree of reaction progress, and the like. Note that when the compound that forms a covalent-bonding cross-linking moiety has a heterocycle, it is possible to more efficiently produce a hydrogen-bonding cross-linking moiety at the same time, and efficiently form a side chain having the covalent-bonding cross-linking moiety as the side chain (c) described later. Therefore, a specific example of a compound having such a heterocycle is described as a suitable compound for producing the side chain (c), particularly together with the side chain (c). Note that it can be said the side chain (c) is a preferable form of the side chain such as the side chain (a) and the side chain (b) because of its structure.

As the polyamine compound, the polyol compound, the polyisocyanate compound, and the polythiol compound that can be used as the "compound that forms a covalent-bonding cross-linking moiety (compound that forms a covalent bond)," it is possible to appropriately use known ones (for example, those described in paragraphs [0094] to [0106] of JP 5918878 B).

Side Chain (c): Side Chain Containing Both Hydrogen-Bonding Cross-Linking Moiety and Covalent-Bonding Cross-Linking Moiety The side chain (c) is a side chain containing both a hydrogen-bonding cross-linking moiety and a covalent-bonding cross-linking moiety in one side chain. The hydrogen-bonding cross-linking moiety contained in the side chain (c) is the same as the hydrogen-bonding cross-linking moiety described in the side chain (a'), and is preferably the same as the hydrogen-bonding cross-linking moiety in the side chain (a). In addition, as the covalent-bonding cross-linking moiety contained in the side chain (c), one same as the covalent-bonding cross-linking moiety in the side chain (b) can be used (this is the case for a suitable cross-linking thereof).

The side chain (c) is preferably a side chain formed when a maleic anhydride-modified thermoplastic resin is reacted with a compound that forms both a hydrogen-bonding cross-linking moiety and a covalent-bonding cross-linking moiety (compound that introduces both a hydrogen-bonding cross-linking moiety and a covalent-bonding cross-linking moiety) on reaction with a functional group (maleic anhydride group) of the maleic anhydride-modified thermoplastic resin.

The compound that forms both a hydrogen-bonding cross-linking moiety and a covalent-bonding cross-linking moiety (compound that introduces both a hydrogen-bonding cross-linking moiety and a covalent-bonding cross-linking moiety) is preferably a compound having a substituent that reacts with a maleic anhydride group (such as a hydroxyl group, a thiol group, an amino group, or an imino group), and more preferably a compound having at least one of a hydroxyl group, an amino group, an imino group, and a thiol group. In addition, the compound that forms both a hydrogen-bonding cross-linking moiety and a covalent-bonding cross-linking moiety (compound that introduces both a hydrogen-bonding cross-linking moiety and a covalent-bonding cross-linking moiety) is preferably a compound having a heterocycle (particularly preferably a nitrogen-containing heterocycle) and capable of forming a covalent-bonding cross-linking moiety (compound that forms a covalent bond), and among others, heterocyclic polyols, heterocyclic polyamines, heterocyclic polythiols, and the like are more preferable. Note that, as the polyol, polyamine, or polythiol containing a heterocycle, it is possible to appropriately use one same as the polyol compound, the polyamine compound, or the polythiol compound described in the above-mentioned "compound capable of forming a covalent-bonding cross-linking moiety (compound that forms a covalent bond)" except that a heterocycle (particularly a nitrogen-containing heterocycle) is contained. In addition, as polyols, polyamines, and polythiols containing a heterocycle, it is possible to appropriately use known ones (for example, ones described in paragraph [0113] of JP 5918878 B).

Regarding Structure Suitable as Covalent-Bonding Cross-Linking Moiety in Side Chains (b) and (c)

Regarding the side chain (b) and/or (c), it is preferable that the cross-linking at the covalent-bonding cross-linking moiety contains a tertiary amino bond (–N=) and an ester bond (—COO—), and these bonding sites also function as hydrogen-bonding cross-linking moieties, from the viewpoint that the cross-linking is stronger by hydrogen bonding with other hydrogen bond cross-linking moieties. As described above, when a tertiary amino bond (—N=) or an ester bond (—COO—) in a side chain having a covalent-bonding cross-linking moiety forms a hydrogen bond with another side chain, the covalent-bonding cross-linking moiety containing the tertiary amino bond (—N=) and the ester bond (—COO—) also includes a hydrogen-bonding cross-linking moiety, and can function as a side chain (c).

Preferable examples of the compound capable of forming a covalent-bonding cross-linking moiety (compound capable of forming both a hydrogen-bonding cross-linking moiety and a covalent-bonding cross-linking moiety: a type of cross-linking agent) containing the tertiary amino bond and/or the ester bond by reacting with a maleic anhydride group as a functional group in the maleic anhydride-modified thermoplastic resin can include polyethylene glycol laurylamine (for example, N,N-bis (2-hydroxyethyl) laurylamine), polypropylene glycol laurylamine (for example, N,N-bis (2-methyl-2-hydroxyethyl) laurylamine), polyethylene glycol octylamine (for example, N,N-bis (2-hydroxyethyl) octylamine), polypropylene glycol octylamine (for example, N,N-bis (2-methyl-2-hydroxyethyl) octylamine), polyethylene glycol stearylamine (for example, N,N-bis (2-hydroxyethyl) stearylamine), and polypropylene glycol stearylamine (for example, N,N-bis (2-methyl-2-hydroxyethyl) stearylamine).

The cross-link of the side chain (b) and/or the side chain (c) at the covalent-bonding cross-linking moiety may be of the same structure described in paragraphs [0100] to [0109] of JP 2017-206604 A, for example. For instance, as the cross-link of the side chain (b) and/or the side chain (c) at the covalent-bonding cross-linking moiety, it is possible to appropriately use one containing at least one structure represented by any of the following general formulas (1) to (3) (note that, in the following structure, when a hydrogen-bonding cross-linking moiety is included, the side chain having that structure is used as the side chain (c)).

[Chem. 1]

(1)

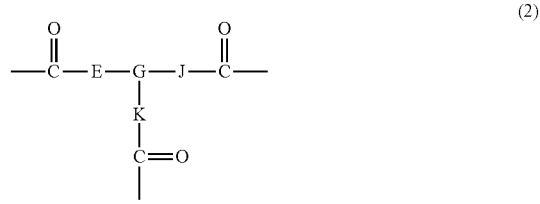

(2)

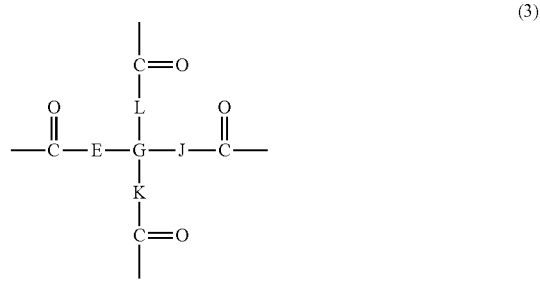

(3)

In the above general formulas (1) to (3), E, J, K, and L are each independently a single bond; an oxygen atom, an amino group NR' (R' is a hydrogen atom or an alkyl group having 1 to 10 carbon atoms), or a sulfur atom; or an organic group which may contain these atoms or groups, and G may contain an oxygen atom, a sulfur atom, or a nitrogen atom, and is a linear, branched, or cyclic hydrocarbon group having 1 to 20 carbon atoms. In addition, the substituent G is preferably groups represented by the following general formulas (111) to (114).

[Chem. 2]

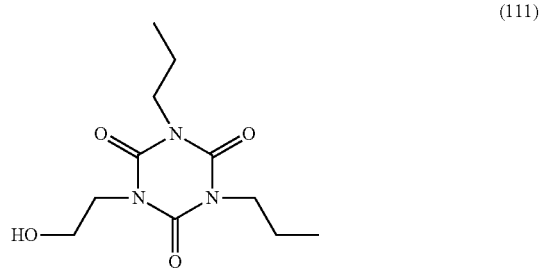

(111)

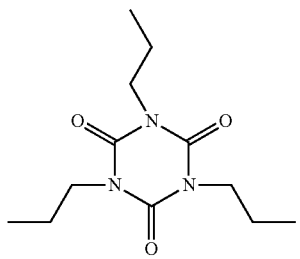
(112)

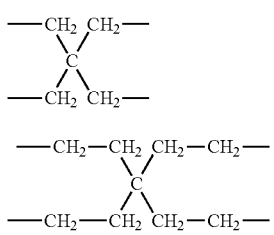
(113)

—CH₂—CH₂ CH₂—CH₂—
　　　＼／
　　　　C
　　　／＼
—CH₂—CH₂ CH₂—CH₂—
(114)

The side chain (a'), the side chain (a), the side chain (b), and the side chain (c) have been described above, and each group (structure) of the side chain in the resin can be confirmed by a commonly used analytical means such as NMR and IR spectra.

In addition, the resin (A) is a resin having the side chain (a) and having a glass transition point of 25° C. or lower, and the resin (B) is a resin containing a hydrogen-bonding cross-linking moiety and a covalent-bonding cross-linking moiety in the side chain and having a glass transition point of 25° C. or lower (such as a resin having both the side chain (a') and the side chain (b) as side chains, or a resin containing the side chain (c) in the side chain). Then, as the resin ingredient according to the present invention, one of the resins (A) and (B) may be used alone, or two or more of them may be mixed and used.

Note that the resin (B) may be a resin having both the side chain (a') and the side chain (b), or a resin having the side chain (c), and the hydrogen-bonding cross-linking moiety contained in the side chain of the resin (B) is preferably a hydrogen-bonding cross-linking moiety having a carbonyl-containing group and/or a nitrogen-containing heterocycle (more preferably a hydrogen-bonding cross-linking moiety having a carbonyl-containing group and a nitrogen-containing heterocycle) from the viewpoint that a stronger hydrogen bond is formed. In addition, the cross-link at the covalent-bonding cross-linking moiety contained in the side chain of the resin (B) is preferably formed by at least one bond selected from the group consisting of amides, esters, and thioesters from the viewpoint that it is possible to induce intermolecular interactions such as hydrogen bonds between the side chains including the cross-linking moiety.

Further, the resins (A) and (B) according to the present invention are both a reaction product of a cross-linking agent with a maleic anhydride-modified thermoplastic resin having a melting point of 68° C. to 134° C. and a maleation rate of 0.5 to 2.5% by mass.

The maleic anhydride-modified thermoplastic resin used for forming the resins (A) and (B) as described above has a melting point of 68° C. to 134° C. (more preferably 70° C. to 130° C., and further preferably 75° C. to 128° C.). When the melting point of the maleic anhydride-modified thermoplastic resin is less than the lower limit, the fluidity tends to decrease. Meanwhile, when the upper limit is exceeded, the fluidity tends to become too high. The melting point employed is a value measured by differential scanning calorimetry (DSC). Note that, in the measurement of the melting point, the rate of temperature rise is set to 10° C./min to carry out measurement.

In addition, the maleic anhydride-modified thermoplastic resin has a maleation rate of 0.5 to 2.5% by mass (more preferably 0.6 to 2.4% by mass, and further preferably 0.7 to 2.3% by mass). When the maleation rate is less than the lower limit, the resistance to compression set tends to decrease. Meanwhile, when the upper limit is exceeded, the resistance to compression set also tends to decrease.

Note that in the present invention, the value (unit: % by mass) of the "maleation rate" is a value obtained by employing the following [Method for Measuring Maleation Rate].

Method for Measuring Maleation Rate

First, 400 mg of the maleic anhydride-modified thermoplastic resin as the measurement target is dissolved in 80 mL of tetrahydrofuran (hereinafter sometimes abbreviated as "THF" for convenience) to obtain a THF solution for measurement. Next, the THF solution for measurement is titrated with an ethanol solution of 0.1 mol/L potassium hydroxide for which a factor having three or more decimal places has been obtained (standard solution for volumetric analysis: ethanol solution of 0.1 mol/L potassium hydroxide with correction: a commercially available one with a factor (characteristic value: corrected value) having three or more decimal places may be used). Here, the end point (neutralization point) is obtained by potentiometric titration using an instrument. In addition, the factor (characteristic value: corrected value) of the ethanol solution of 0.1 mol/L potassium hydroxide may be determined by titration with an oxalic acid standard solution, and in the case of using a commercially available product for which a factor has been obtained, the factor described on a commercially available reagent (for example, the factor described in the test report of that reagent) may be used as it is. Then, the same measurement is performed except for not using a maleic anhydride-modified thermoplastic resin (blank test) to carry out titration and to also determine the amount (blank value) of an ethanol solution of 0.1 mol/L potassium hydroxide dropped to 80 mL of THF. Next, the acid value is calculated based on the following "Acid Value Calculation Formula" using the obtained titration value (amount dropped). Then, the obtained acid value is used to calculate the maleation rate based on the following "Maleation Rate Calculation Formula." As a result, the maleation rate (unit: % by mass) is obtained.

Acid Value Calculation Formula $$[\text{Acid Value}]=(A-B)\times M_1 \times C \times f/S$$

(in the formula, A indicates the amount dropped of the ethanol solution of 0.1 mol/L potassium hydroxide required for neutralizing the solution for measurement (titration value: mL), B indicates the amount dropped of 0.1 mol/L potassium hydroxide in ethanol solution in a blank (blank test) (titration value (blank value: mL) obtained by performing the same measurement except for not using a maleic anhydride-modified thermoplastic resin), $M_1$ indicates the molecular weight of potassium hydroxide (56.1 (constant)), C indicates the concentration of potassium hydroxide in the ethanol solution of potassium hydroxide (0.1 mol/L (constant)), f indicates the factor of the ethanol solution of potassium hydroxide (corrected value: the factor described on a commercially available reagent (for example, the factor described in the test report of a reagent) may be used as they are), S indicates the mass (400 g (constant)) of the maleic anhydride-modified thermoplastic resin used for the measurement. Note that the unit of "acid value" obtained by the above calculation is "mg KOH/g.")

Maleation Rate Calculation Formula $$[\text{Maleation Rate}] = [\text{Acid Value}] \div M_1 \times M_2 \div 1000 \times 100 \div 2$$

(in the formula, the acid value indicates the value (unit: mg KOH/g) obtained by the above "Acid Value Calculation Formula," $M_1$ indicates the molecular weight of potassium hydroxide (56.1 (constant)), and $M_2$ indicates the molecular weight of maleic anhydride (98.1 (constant)). The unit of "maleation rate" obtained by the above calculation is "% by mass.").

In addition, as the main chain of the maleic anhydride-modified thermoplastic resin (resin forming the main chain portion of the resins (A) and (B)), it is possible to use those appropriately selected from so-called thermoplastic resins so that the melting point of the maleic anhydride-modified thermoplastic resin is 68° C. to 134° C. (note that the "thermoplastic resin" in the maleic anhydride-modified thermoplastic resin mentioned in the present specification refers to a polymer having thermoplasticity and having a melting point of 68° C. or higher (preferably having a melting point in the range of 68° C. to 134° C.), and refers to a thermoplastic polymer other than the so-called "elastomer" or "rubber"). The main chain of the maleic anhydride-modified thermoplastic resin (resin forming the main chain portion of the resins (A) and (B)) is not particularly limited, but among others, more preferably at least one selected from the group consisting of polyolefin-based resins, polyester-based resins, and polyamide-based resins, and particularly preferably a polyolefin-based resin.

The polyolefin-based resin forming the main chain of the maleic anhydride-modified thermoplastic resin may be a polymer of an α-olefin, or may be a resin composed of a copolymer of an α-olefin and another copolymerizable monomer. Examples of the polyolefin-based resins include polyethylene (PE: high density polyethylene (HDPE), medium density polyethylene (MDPE), low density polyethylene (LDPE), and linear polyethylene (L-LDPE)), ultra-high molecular weight polyethylene (UHPE), ethylene-ethyl acrylate copolymer (EEA), ethylene-butyl acrylate copolymer (EBA), and ethylene-methyl acrylate copolymer (EMA). Note that the high density polyethylene means polyethylene having a density of 0.94 g/m$^3$ or more, the medium density polyethylene means polyethylene having a density of 0.92 g/m$^3$ or more and less than 0.94 g/m$^3$, and the low density polyethylene means polyethylene having a density of 0.91 g/m$^3$ or more and less than 0.92 g/m$^3$.

In addition, the maleic anhydride-modified thermoplastic resin may be a modified product of the maleic anhydride of a thermoplastic resin and may satisfy the above-mentioned conditions for melting point and maleation rate, and can be easily produced by employing a known method for preparing a maleic anhydride-modified thermoplastic resin and appropriately adjusting the type of raw material and the amount used thereof so as to satisfy the above conditions. In addition, as such a maleic anhydride-modified thermoplastic resin, a commercially available product may be appropriately used as long as it satisfies the above conditions.

Furthermore, among such maleic anhydride-modified thermoplastic resins, polyolefin-based resins modified with maleic anhydride are more preferable, high density polyethylene modified with maleic anhydride and linear polyethylene (L-LDPE) modified with maleic anhydride are further preferable, and high density polyethylene modified with maleic anhydride is particularly preferable.

In addition, the cross-linking agent is not particularly limited and may be any as long as it can react with the maleic anhydride group in the maleic anhydride-modified thermoplastic resin to form any of the resins (A) and (B), and depending on the desired design, one may appropriately select and use a compound capable of reacting with a maleic anhydride group to form various cross-linked moieties (compound capable of forming a target side chain).

As such a cross-linking agent, it is possible to appropriately use the above-mentioned "compound that forms a hydrogen-bonding cross-linking moiety (more preferably a compound capable of introducing a nitrogen-containing heterocycle)" or "compound that forms a covalent-bonding cross-linking moiety (compound that forms a covalent bond)." In addition, as such a cross-linking agent, a compound having at least one of a hydroxyl group, an amino group, an imino group, and a thiol group is preferable from the viewpoint that the reaction proceeds efficiently. In addition, the compound having at least one of a hydroxyl group, an amino group, an imino group, and a thiol group is more preferably a compound having a nitrogen-containing heterocycle (the nitrogen-containing heterocycle is more preferably at least one selected from a triazole ring, an isocyanurate ring, a thiadiazole ring, a pyridine ring, an imidazole ring, a triazine ring, and a hydantoin ring) (note that the "nitrogen-containing heterocycle" mentioned here is the same as that described above, including those suitable for use). Examples of the compound having at least one of a hydroxyl group, an amino group, an imino group, and a thiol group include tris (2-hydroxyethyl) isocyanurate; 2,4-diamino-6-phenyl-1,3,5-triazine, acetoguanamine, 3-amino-1,2,4-triazole, aminopyridine (2-, 3-, 4-), 3-amino-5-methylisoxazole, 2-aminomethylpiperidine, 1-(2-hydroxyethyl) imidazole, 2-butyl-5-hydroxymethylimidazole, 1,3-dihydro-1-phenyl-2H-benzimidazole-2-thione, chelidamic acid, kojic acid, 2,5-dimercapto-1,3,4-thiadiazole, 1-phenyl-5-mercapto-1,2,3,4-tetrazole, 1-methyl-5-mercapto-1,2,3,4-tetrazole, tris hydroxyethyl triazine, tris-[(3-mercaptopropionyloxy)-ethyl]-isocyanurate, hydroxypyridine (2-, 3-, 4-), 1-hydroxybenzotriazole, 1-(2-aminoethyl) piperazine, bis (aminopropyl) piperazine, piperidine ethanol (2-, 3-, 4-), piperidine methanol (2-, 3-, 4-), pyridine ethanol (2-, 3-, 4-), pyridine methanol (2-, 3-, 4-), benzoguanamine, 4-methyl-5-(2'-hydroxyethyl) thiazole, 1-methylol-5,5-dimethylhydantoin, melamine, and mercaptopyridine (2-, 3-, 4-). Such compounds may be used alone or in admixture of two or more.

In addition, from the viewpoint of high reactivity and industrial availability, the cross-linking agent is preferably at least one compound selected from the group consisting of nitrogen-containing compounds which may have at least one substituent from a hydroxyl group, a thiol group, an amino group, and an imino group, oxygen-containing compounds which may have at least one substituent from a hydroxyl group, a thiol group, an amino group, and an imino group, and sulfur-containing compounds which may have at least one substituent from a hydroxyl group, a thiol group, an amino group, and an imino group. Note that the "compound that forms a hydrogen-bonding cross-linking moiety (compound that can introduce a nitrogen-containing heterocycle)" and "compound that forms a covalent-bonding cross-linking moiety (compound that forms a covalent bond)" can be appropriately selected from known compounds (compounds described in Japanese Unexamined Patent Application Publication No. 2017-57322 and JP 5918878 B) and used as long as they can react with a maleic anhydride group.

In addition, the cross-linking agent is preferably at least one selected from the group consisting of triazoles which may have at least one substituent from a hydroxyl group, a thiol group, an amino group, and an imino group; pyridines which may have at least one substituent from a hydroxyl group, a thiol group, an amino group, and an imino group; thiadiazoles which may have at least one substituent from a hydroxyl group, a thiol group, an amino group, and an imino group; imidazoles which may have at least one substituent from a hydroxyl group, a thiol group, an amino group, and an imino group; isocyanurates which may have at least one substituent from a hydroxyl group, a thiol group, an amino group, and an imino group; triazines which may have at least one substituent from a hydroxyl group, a thiol group, an amino group, and an imino group; hydantoins which may have at least one substituent from a hydroxyl group, a thiol group, an amino group, and an imino group; tris (2-hydroxyethyl) isocyanurate; 2,4-diamino-6-phenyl-1,3,5-triazine; pentaerythritol; sulfamide; and polyether polyols.

From the viewpoint of resistance against compression set, the cross-linking agent is preferably tris (2-hydroxyethyl) isocyanurate, sulfamide, pentaerythritol, 2,4-diamino-6-phenyl-1,3,5-triazine, and polyether polyol, and further preferably pentaerythritol, 2,4-diamino-6-phenyl-1,3,5-triazine, and tris (2-hydroxyethyl) isocyanurate.

In addition, the method for obtaining a reaction product of the maleic anhydride-modified thermoplastic resin and the cross-linking agent is not particularly limited, and may be a method capable of forming the resins (A) and (B) by reacting a maleic anhydride group in the maleic anhydride-modified thermoplastic resin with a functional group in a cross-linking agent (may be a method capable of forming the cross-linking moiety described in the resins (A) and (B)), and the reaction may be appropriately carried out according to the type of the cross-linking agent and the like. For example, one may employ a method in which a cross-linking agent is added and reacted while mixing (kneading) the maleic anhydride-modified thermoplastic resin using a kneading machine such as a kneader at a temperature at which the maleic anhydride-modified thermoplastic resin can be plasticized and the cross-linking agent to be added can be reacted with the maleic anhydride group (for example, about 100 to 250° C.).

Moreover, the resin composition of the present invention may contain an additional ingredient other than the resin ingredient. As the additional ingredient, it is possible to appropriately use a known ingredient that can be used in the resin composition, and examples thereof include various ingredients such as polymers other than the resin ingredients (A) and (B), reinforcing agents (fillers), hydrogen-bonding reinforcing agents (fillers), fillers obtained by introducing amino groups (hereinafter simply referred to as "amino group-introduced fillers"), amino group-containing compounds other than the amino group-introduced fillers, compounds containing metal elements, maleic anhydride-modified polymers, anti-aging agents, antioxidants, pigments (dyes), plasticizers (softening agents), thixotropy-imparting agents, ultraviolet absorbers, flame retardants, solvents, surfactants (including leveling agents), process oils (such as paraffinic oil, naphthenic oil, and aroma oil), various oils other than the process oils, dispersants, dehydrators, corrosion inhibitors, adhesives, antistatic agents, fillers, lubricants, and processing aids (vulcanization accelerators such as stearic acid and zinc oxide when vulcanizing).

In addition, when the above additional ingredients are contained, the content of the resin ingredient in the resin composition of the present invention is preferably 1 to 99% by mass, more preferably 10 to 99% by mass, and further preferably 20 to 99% by mass. When the content of the resin ingredient in the resin composition is less than the lower limit, the effect obtained based on the resin ingredient tends to be low. Meanwhile, when the upper limit is exceeded, mixing tends to be difficult.

In addition, the resin composition of the present invention preferably further contains, as the additional ingredient, an α-olefin-based resin having no chemically bonding cross-linking moiety. The "α-olefin-based resin" mentioned here refers to a homopolymer of α-olefin and a copolymer of α-olefin, and the "α-olefin" refers to an alkene having a carbon-carbon double bond at the α-position, and examples thereof include ethylene, propylene, 1-butene, 1-pentene, 1-hexene, 1-heptene, 1-octene, 1-nonene, and 1-decene. As the α-olefin-based resin having no chemically bonding cross-linking moiety, it is possible to preferably use ones described in paragraphs [0204] to [0214] of JP 2017-57322 A, for example.

In addition, as the α-olefin-based resin having no chemically bonding cross-linking moiety, it is possible to preferably use polypropylene, polyethylene, ethylene-propylene copolymer, ethylene-butene copolymer, and ethylene-octene copolymer, for example. In addition, among the above α-olefin-based resins, it is possible to preferably use an α-olefin-based resin having a crystallinity of 10% or more (such as polypropylene, ethylene-propylene copolymer, ethylene-butene copolymer, polyethylene, or polybutene). The method for producing an α-olefin-based resin having no chemically bonding cross-linking moiety is not particularly limited, and a known method can be appropriately employed. In addition, as such an α-olefin-based resin, a commercially available product may be used. Note that, as the α-olefin-based resin having no chemically bonding cross-linking moiety, one kind may be used alone, or two or more kinds may be used in combination.

When an α-olefin-based resin having no chemically bonding cross-linking moiety is contained in the resin composition, the content of the α-olefin-based resin is more preferably 500 parts by mass or less (more preferably 5 to 250 parts by mass, and most preferably 35 to 200 parts by mass) relative to 100 parts by mass of the resin ingredient. When the content of such an α-olefin-based resin is less than the lower limit, the effect tends to be low. Meanwhile, when the upper limit is exceeded, the hardness tends to be so high that it becomes difficult to impart a sufficiently high degree of flexibility to the resin composition.

Moreover, the resin composition of the present invention more preferably contains a process oil as the additional ingredient from the viewpoint that the fluidity of the composition can be further improved and the workability during use becomes higher, and further, the hardness of the resin composition can be adjusted more efficiently. Examples of the process oil include paraffinic oil, naphthenic oil, and aroma oil, and paraffinic oil is more preferable. The paraffinic oil is not particularly limited, and known paraffinic oils can be appropriately used. For example, it is possible to preferably use ones described in paragraphs [0153] to [0157] of Japanese Unexamined Patent Application Publication No. 2017-57323. Note that the paraffinic oil is preferably such that, when correlation ring analysis (n-d-M ring analysis) based on ASTM D3238-85 is performed on the oil to determine the percentage of the number of paraffinic carbons to the total number of carbons (paraffinic part: CP), the percentage of the number of naphthenic carbons to the total number of carbons (naphthenic part: CN), and the percentage of the number of aromatic carbons to the total number of carbons (aromatic part: CA), the percentage of the number of the paraffinic carbons (CP) to the total number of carbons is 60% or more. In addition, from the viewpoint of fluidity and safety, the paraffinic oil preferably has a kinematic viscosity of 10 mm$^2$/s to 700 mm$^2$/s at 40° C., which is measured in accordance with JIS K 2283 (issued in 2000). Moreover, from the viewpoint of fluidity and safety, the paraffinic oil has an aniline point of preferably 80° C. to 145° C. measured by the U-shaped tube method based on JIS K2256 (issued in 2013). As the method for measuring the kinematic viscosity and the aniline point, it is possible to employ the methods described in paragraphs [0153] to [0157] of JP 2017-57323 A. As such paraffinic oil, commercially available ones can be appropriately used.

When the paraffinic oil is contained in the resin composition, the content of the paraffinic oil is preferably 10 to 10000 parts by mass, and particularly preferably 30 to 1000 parts by mass relative to 100 parts by mass of the resin ingredient. When the content of the paraffinic oil is less than the lower limit, the content of paraffinic oil is too low, and the effects obtained by adding paraffinic oil, such as improving fluidity and workability, tend to be insufficient. Meanwhile, when the upper limit is exceeded, bleeding of paraffinic oil is likely to be induced, and it tends to be difficult to obtain a resin composition in a uniform state.

Further, the resin composition of the present invention preferably contains a styrene block copolymer having no chemically bonding cross-linking moiety as the additional ingredient from the viewpoint of preventing bleeding when oil is used. Therefore, as the resin composition of the present invention, it is preferable to contain the paraffinic oil and the styrene block copolymer having no chemically bonding cross-linking moiety in combination. As described above, when the paraffinic oil and the styrene block copolymer are contained in combination, the styrene block copolymer can absorb the oil, and it is possible to improve the fluidity of the obtained resin composition to a higher degree and also to adjust the hardness more efficiently while suppressing oil bleeding and the like more sufficiently. As the styrene block copolymer having no chemically bonding cross-linking moiety, it is possible to preferably use ones described in paragraphs [0156] to [0163] of Japanese Unexamined Patent Application Publication No. 2017-57393. Note that the "styrene block copolymer" may be a polymer having a styrene block structure at any site.

The styrene block copolymer having no chemically bonding cross-linking moiety is preferably a styrene block copolymer having a styrene content of 10 to 50% by mass (more preferably 20 to 40% by mass) from the viewpoint of mechanical strength and oil absorption. In addition, from the viewpoint of mechanical strength and oil absorption, as the weight average molecular weight (Mw), number average molecular weight (Mn), and dispersity of the molecular weight distribution (Mw/Mn) of the styrene block copolymer, Mw is preferably 200,000 or more and 700,000 or less (more preferably 350,000 or more and 550,000 or less), Mn is preferably 100,000 or more and 600,000 or less (more preferably 200,000 or more and 500,000 or less), and the Mw/Mn is preferably 5 or less (more preferably 1 to 3). From the viewpoint of elastomeric properties (from the viewpoint of having sufficient elastomeric properties), the glass transition point of the styrene block copolymer is preferably −80 to −30° C. (more preferably −70 to −40° C.) As a method for measuring such various characteristics (such as Mw and Mn), the methods described in paragraphs [0156] to [0163] of JP 2017-57393 A are employed.

As the styrene block copolymer having no chemically bonding cross-linking moiety, it is possible to appropriately use known ones (such as SIS, SEPS, SBS, SIBS, SEEPS, and SEBS), and styrene-ethylene-ethylene-propylene-styrene block copolymer (SEEPS) and styrene-ethylene-butylene-styrene block copolymer (SEBS) are more preferable from the viewpoint of high molecular weight, industrial availability, and economy. As the styrene block copolymer, one kind may be used alone, or two or more kinds may be used in combination. As the styrene block copolymer, a commercially available one can be appropriately used.

In addition, when the resin composition of the present invention contains the styrene block copolymer having no chemically bonding cross-linking moiety, the content of the styrene block copolymer is preferably 1 to 3000 parts by mass, and more preferably 5 to 1000 parts by mass relative to 100 parts by mass of the resin ingredient. When the content ratio is less than the lower limit, the oil tends to bleed when the oil is added. Meanwhile, when the upper limit is exceeded, the moldability tends to decrease.

In addition, the resin composition of the present invention preferably contains a reinforcing agent (filler) as the additional ingredient from the viewpoint of improving the breaking physical properties (breaking strength, breaking elongation). As the reinforcing agent, for example, silica, carbon black, clay (which may be organic clay), calcium carbonate (which may be surface-treated), and the like are preferable. In addition, as the reinforcing agent, clay is more preferable. As the clay, it is possible to appropriately use known clay (for example, that described in paragraphs [0146] to [0156] of JP 5918878 B, that described in paragraphs [0146] to [0155] of Japanese Unexamined Patent Application Publication No. 2017-057393, and the like). In addition, among such clays, from the viewpoint of high dispersibility, at least one selected from the group consisting of clays containing silicon and magnesium as main ingredients and organic clays is preferable, and organic clays are particularly preferable. In addition, when the resin composition of the present invention contains a reinforcing agent, the content of the reinforcing agent is preferably 20 parts by mass or less, and more preferably 0.01 to 10 parts by mass relative to 100 parts by mass of the resin ingredient. As the reinforcing agent, one kind may be used alone, or two or more kinds may be used in combination depending on the intended use.

In addition, the resin composition of the present invention preferably contains the anti-aging agent, antioxidant, and the like, depending on its use. Note that the content of the anti-aging agent or antioxidant is not particularly limited, but is preferably 20 parts by mass or less (more preferably 0.01 to 10 parts by mass) relative to 100 parts by mass of the resin ingredient. In this way, additional ingredients can be appropriately used depending on the intended use and design. The additional ingredients are not particularly limited to the ones described above, and it is possible to appropriately use known ingredients used in compositions containing polymers (for example, ones described in paragraphs [0169] to [0174] of JP 5918878 B). In addition, as the additional ingredients, one kind may be used alone, or two or more kinds may be used in combination depending on the intended use.

In addition, the method for producing the resin composition is not particularly limited, and any method can be used as long as the reaction product of the maleic anhydride-modified thermoplastic resin with the cross-linking agent can be contained in the composition. Such method may be, for example, the method described in paragraphs [0181] to [0215] of Japanese Unexamined Patent Application Publication No. 2016-193970 with an alteration that the "elastomeric polymer having a cyclic acid anhydride group in the side chain" described in the publication is changed to the "maleic anhydride-modified thermoplastic resin" and the "raw material compound" described in the publication is changed to the "cross-linking agent." Except for that, the same method as the method described in the same paragraphs of the publication may be employed to react the maleic anhydride-modified thermoplastic resin with the cross-linking agent, thereby producing a resin composition containing the resin ingredient made up of the obtained reaction product.

For example, as a method for producing the resin composition, it is possible to preferably employ a method for obtaining a resin composition containing the resin ingredient by mixing the maleic anhydride-modified thermoplastic resin, the cross-linking agent, and the additional ingredient as necessary (such as the styrene block copolymer having no chemically bonding cross-linking moiety, paraffinic oil, the α-olefin-based resin having no chemically bonding cross-linking moiety, or the additive). In this method, during the mixing, it is preferable to prepare the resin (A) and the resin (B) by reacting a maleic anhydride group in the maleic anhydride-modified thermoplastic resin with a functional group in the cross-linking agent to form a specific cross-link. In this method, during the mixing, the maleic anhydride-modified thermoplastic resin can be reacted with the cross-linking agent, and during the reaction, the maleic anhydride group contained in the maleic anhydride-modified thermoplastic resin can be opened to form a chemical bond with the cross-linking agent. Thereby, "at least one resin ingredient selected from the group consisting of the resin (A) and the resin (B)" as the target can be efficiently formed according to the type of the ingredient.

In addition, when the maleic anhydride-modified thermoplastic resin is reacted with the cross-linking agent by the above method, the amount of the cross-linking agent used is preferably 0.1 to 10 parts by mass, and more preferably 0.2 to 5.0 parts by mass relative to 100 parts by mass of the maleic anhydride-modified thermoplastic resin. When the amount of the cross-linking agent added (amount based on parts by mass) is less than the lower limit, the amount of the cross-linking agent is too small, the cross-linking density does not increase, and the desired physical properties tend not to be exhibited. Meanwhile, when the upper limit is exceeded, the amount is too large and there are many branches (the proportion of the cross-linking agent not involved in the cross-linking is increased because the amount of the cross-linking agent is too large), and the cross-linking density tends to decrease.

In addition, in the above method, the temperature condition when the maleic anhydride-modified thermoplastic resin is reacted with the cross-linking agent (maleic anhydride group is opened) is not particularly limited, and may be adjusted to a temperature at which they can react, depending on the type of the cross-linking agent and the like. For example, the temperature is preferably 100 to 250° C., and more preferably 120 to 230° C. from the viewpoint of softening and instantly advancing the reaction. In addition, the mixing method for carrying out the reaction is not particularly limited, and it is possible to appropriately employ a known method of mixing with a roll, a kneader, or the like. Moreover, when additional ingredients are added, the order of addition of the ingredients is not particularly limited, and may be appropriately changed according to the type of the ingredient to be used. For example, in the production of the resin composition, in the case of adding the styrene block copolymer having no chemically bonding cross-linking moiety, the paraffinic oil, or the α-olefin-based resin having no chemically bonding cross-linking moiety as additional ingredients, the following method may be employed. For example, a method may be employed in which the styrene block copolymer and the paraffinic oil are first mixed under temperature conditions of 100 to 250° C. to obtain a mixture, then the maleic anhydride-modified thermoplastic resin and the α-olefin-based resin are added to the mixture under the temperature conditions followed by mixing and plasticization, and a cross-linking agent is added thereto and mixed under the temperature conditions to react the maleic anhydride-modified thermoplastic resin with the cross-linking agent, thereby obtaining a resin composition containing a reaction product of the maleic anhydride-modified thermoplastic resin and the cross-linking agent, the styrene block copolymer, the paraffinic oil, and the α-olefin-based resin (note that, when additional ingredients such as the reinforcing agent (filler) and the anti-aging agent are further contained, the ingredients may be appropriately added and mixed at any stage according to the ingredients to be used). Note that the amount and the like of these additional ingredients added can be appropriately changed according to the desired design (for example, the amount added may be appropriately set so as to be within the above-mentioned suitable content range).

EXAMPLES

Hereinafter, the present invention is described in more detail based on Examples and Comparative Examples, but the present invention is not limited to the following Examples.

First, Table 1 presents the resin type, abbreviation, characteristics, and the like of the maleic anhydride-modified thermoplastic resin used in each Example. Note that in Tables 2 to 5, the maleic anhydride-modified thermoplastic resins used in each of the Examples and the like are described using the abbreviations presented in Table 1 for convenience. In addition, the "maleation rate" presented in Table 1 is a value obtained by employing [Method for Measuring Maleation Rate] described above (note that in the titration, the automatic potentiometric titrator used was the trade name "AT-710M" manufactured by Kyoto Electronics Manufacturing Co., Ltd., and the ethanol solution of 0.1 mol/L potassium hydroxide used was the trade name "Potassium Hydroxide Solution in Ethanol" manufactured by Merck & Co., Inc. The corrected value (factor) of the ethanol solution of 0.1 mol/L potassium hydroxide used in this manner was 1.00 as confirmed from the test report of the solution.). In addition, the "melting point" presented in Table 1 is a value measured by using 0.01 g of each resin and using a differential scanning calorimeter (manufactured by Hitachi High-Tech Corporation under the trade name "DSC7000X") at a rate of temperature rise of 10° C./min (value obtained by differential scanning calorimetry (DSC)).

TABLE 1

On Maleic Anhydride-Modified Thermoplastic Resin

| Abbreviation | Product Name (Manufacturer) | Resin Type | Maleation Rate [Unit: % by Mass] | Melting Point [Unit: °C.] | Glass Transition Point [Unit: °C.] |
|---|---|---|---|---|---|
| TP(1) | Fusabond E226Y (DuPont de Nemours, Inc.) | Maleated LLDPE | 0.9 | 122 | −125 |
| TP(2) | Fusabond E265 (DuPont de Nemours, Inc.) | Maleated HDPE | 1.0 | 131 | −122 |
| TP(3) | Bondyram 4108 (Polyram Plastic Industries LTD) | Maleated LLDPE | 1.0 | 122 | −126 |
| TP(4) | Bondyram TL4112 (Polyram Plastic Industries LTD) | Maleated mLLDPE | 0.8 | 124 | −124 |
| TP(5) | Orevac 18341 (Arkema) | Maleated LLDPE | 0.5 | 95 | −125 |
| TP(6) | Orevac 18507 (Arkema) | Maleated HDPE | 0.8 | 128 | −121 |
| TP(7) | Fusabond E100 (DuPont de Nemours, Inc.) | Maleated HDPE | 0.9 | 125 | −122 |
| TP(8) | ADPOLY MB-200 (LOTTE Co., Ltd.) | Maleated LLDPE | 0.9 | 120 | −126 |
| TP(9) | Bondyram 5108 (Polyram Plastic Industries LTD) | Maleated HDPE | 1.0 | 130 | −122 |
| TP(10) | Fusabond P613 (DuPont de Nemours, Inc.) | Maleated PP (Homo) | 0.4 | 162 | −35 |
| TP(11) | UMEX 1001 (Sanyo Chemical Industries, Ltd.) | Maleated PP | 4.4 | 142 | −20 |
| TP(12) | UMEX 1010 (Sanyo Chemical Industries, Ltd.) | Maleated PP | 9.3 | 135 | −21 |
| TP(13) | Lotader TX8030 (Arkema) | Maleated E-EA13% | 2.8 | 65 | −25 |
| TP(14) | Orevac CA100 (Arkema) | Maleated Homo PP | 1.0 | 147 | −34 |
| TP(15) | Lotader 3410 (Arkema) | Maleated E-BA17% | 3.1 | 47 | −28 |
| TP(16) | Lotader 3430 (Arkema) | Maleated E-MA15% | 3.1 | 45 | −20 |
| TP(17) | ADPOLY BM-310 (LOTTE Co., Ltd.) | Maleated HDPE | 0.4 | 120 | −120 |
| TP(18) | Bondyram TL4101A (Polyram Plastic Industries LTD) | Maleated HDPE | 0.3 | 127 | −121 |

Next, description is provided on a method for evaluating the characteristics of the resin composition obtained in each of the Examples described later.

Melt Flow Rate (MFR)

The resin composition obtained in each of the Examples and Comparative Examples was used to measure the melt flow rate (MFR, unit: g/10 min) according to Method B described in JIS K6922-2 (issued in 2010). Specifically, by use of the resin composition obtained in each of the Examples and Comparative Examples and use of the trade name "Melt Indexer G-01" manufactured by Toyo Seiki Seisaku-sho, Ltd. as a melt flow rate measuring device under the conditions that 3 g of the resin composition was added to the furnace of the device, the temperature was adjusted to and kept at 230° C. for minutes, and then 5 kg of load was applied while maintaining the temperature at 230° C., the mass (g) flowing out per unit time was measured from the opening (opening of 1 mm in diameter) of the tubular orifice member having a diameter of 1 mm and a length of 8 mm connected to the lower part of the furnace (the temperature was kept at 230° C. for 5 minutes in the furnace, and then the load was started, and thereafter the measurement of the mass of the outflowing resin composition was started), and was converted into the mass (g) of the resin composition flowing out for 10 minutes.

Compression Set (C-Set)

The resin composition obtained in each of the Examples and Comparative Examples was used, and first, the resin composition was heat-pressed at 200° C. for 10 minutes to prepare a sheet having a thickness of about 2 mm. The sheet thus obtained was punched into a disk shape having a diameter of 29 mm, and seven disks were stacked to prepare a sample so that the height (thickness) was 12.5±0.5 mm. The sample thus obtained was used and compressed by 25% with a dedicated jig, and the compression set (unit: %) after left at 70° C. for 22 hours was measured according to JIS K6262 (issued in 2013). Note that the compression device used was the trade name "Vulcanized Rubber Compression Set Test Machine SCM-1008L" manufactured by DUMB-BELL CO., LTD.

Examples 1 to 9 and Comparative Examples 1 to 9

In each of the Examples 1 to 9 and Comparative Examples 1 to 9, the resin composition was produced by adjusting the amount of each ingredient used so as to have the compositions presented in Tables 2 to 3 below and employing the "Step of Producing Resin Composition" described later. Note that the numerical values of the compositions in Tables 2 to 3 below are values (parts by mass) obtained by the conversion where the amount of the maleic anhydride-modified thermoplastic resin used in Examples and the like is set to 100 parts by mass, and in Examples 1 to 9 and Comparative Examples 1 to 9, the amount of the maleic anhydride-modified thermoplastic resin used was 8 g.

Step of Producing Resin Composition

First, the styrene-ethylene-butylene-styrene block copolymer was charged into a pressure kneader (manufactured by Kraton Polymers Japan Ltd. under the trade name "G1651HU," styrene content 33% by mass: hereinafter sometimes referred to as "SEBS"), and while mixing under the condition of 180° C., paraffinic oil (manufactured by SK lubricants Japan Co., Ltd. under the trade name "YUBASE8J") was added dropwise to the pressure kneader, and SEBS and paraffinic oil were mixed for 1 minute. Next, into the pressure kneader, a maleic anhydride-modified thermoplastic resin (in each of the Examples and Comparative Examples, any one of TP (1) to (18) presented in Table 1 was used), an ethylene-butene copolymer (manufactured by Mitsui Chemicals, Inc. under the trade name "TAFMER DF7350": hereinafter sometimes referred to as "EBM"), a high density polyethylene (manufactured by Japan Polyethylene Corporation under the trade name "HJ590N": hereinafter sometimes referred to as "HDPE"), and an anti-aging agent (manufactured by ADEKA Corporation under the trade name "AO-50") were further added, and mixed (kneaded) at 180° C. for 2 minutes and plasticized to obtain a mixture. Next, organic clay (manufactured by Hojun Co., Ltd. under the trade name "ESBEN WX") was added to the mixture in the pressure kneader and mixed (kneaded) at 180° C. for 4 minutes, and then tris(2-hydroxyethyl) isocyanurate (manufactured by Nissei Corporation under the trade name "TANAC P") was added as a cross-linking agent and mixed (kneaded) at 180° C. for 8 minutes. Thus, a resin composition was produced.

Tables 2 and 3 present the measured values of the characteristics (MFR and C-Set) of the resin compositions obtained as above in Examples and Comparative Examples. Here, when the MFR is 300 g/10 min or more, the MFR is indicated as "Excessive." Note that in the tables below, regarding "Evaluation of Maleation Rate" for maleic anhydride-modified thermoplastic resin, those satisfying the condition that the maleation rate is in the range of 0.5 to 2.5% by mass are represented by "S," while those not satisfying the condition that the maleation rate is in the range of 0.5 to 2.5% by mass are represented by "F." In addition, in the tables below, regarding "Evaluation of Melting Point" for maleic anhydride-modified thermoplastic resin, those satisfying the condition that the melting point is in the range of 68° C. to 134° C. are represented by "S," while those not satisfying the condition that the melting point is in the range of 68° C. to 134° C. are represented by "F." Therefore, in the tables, those with "S" in terms of both the evaluation of maleation rate (condition on maleation rate) and the evaluation of melting point (condition on melting point) are the "maleic anhydride-modified thermoplastic resin having a melting point of 68° C. to 134° C. and a maleation rate of 0.5 to 2.5% by mass" according to the present invention.

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| Maleic Anhydride-Modified Thermoplastic Resin | Type | TP(1) | TP(2) | TP(3) | TP(4) | TP(5) | TP(6) | TP(7) | TP(8) | TP(9) |
| | Evaluation of Maleation Rate | S | S | S | S | S | S | S | S | S |
| | Evaluation of Melting Point | S | S | S | S | S | S | S | S | S |
| Resin Composition [Parts by Mass] | Maleic Anhydride-Modified Thermoplastic Resin | 100 | 100 | 100 | 100 | 100 | 100 | 100 | 100 | 100 |
| | Clay | 0.1 | 0.1 | 0.1 | 0.1 | 0.1 | 0.1 | 0.1 | 0.1 | 0.1 |
| | Cross-Linking Agent (Tris (2-Hydroxyethyl) Isocyanurate) | 0.88 | 0.98 | 0.98 | 0.73 | 0.59 | 0.78 | 0.83 | 0.88 | 0.98 |
| | Anti-Aging Agent | 2.01 | 2.01 | 2.01 | 2.01 | 2.01 | 2.01 | 2.01 | 2.01 | 2.01 |
| | SEBS | 100 | 100 | 100 | 100 | 100 | 100 | 100 | 100 | 100 |
| | Paraffinic Oil | 333.3 | 333.3 | 333.3 | 333.3 | 333.3 | 333.3 | 333.3 | 333.3 | 333.3 |
| | HDPE | 66.7 | 66.7 | 66.7 | 66.7 | 66.7 | 66.7 | 66.7 | 66.7 | 66.7 |
| | EBM | 66.7 | 66.7 | 66.7 | 66.7 | 66.7 | 66.7 | 66.7 | 66.7 | 66.7 |
| | Total Amount | 669.7 | 669.8 | 669.8 | 669.5 | 669.4 | 669.6 | 669.6 | 669.7 | 669.8 |
| Evaluation of Composition Characteristics | Compression Set [Unit: %] | 38 | 41 | 38 | 36 | 37 | 36 | 42 | 38 | 38 |
| | MFR [Unit: g/10 min] | 34 | 25 | 44 | 44 | 69 | 109 | 65 | 51 | 56 |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Maleic Anhydride-Modified Thermoplastic Resin | Type | TP(10) | TP(11) | TP(12) | TP(13) | TP(14) | TP(15) | TP(16) | TP(17) | TP(18) |
| | Evaluation of Maleation Rate | F | F | F | F | S | F | F | F | F |
| | Evaluation of Melting Point | F | F | F | F | F | F | F | S | S |
| Composition [Parts by Mass] | Maleic Anhydride-Modified Thermoplastic Resin | 100 | 100 | 100 | 100 | 100 | 100 | 100 | 100 | 100 |
| | Clay | 0.1 | 0.1 | 0.1 | 0.1 | 0.1 | 0.1 | 0.1 | 0.1 | 0.1 |
| | Cross-Linking Agent (Tris (2-Hydroxyethyl) Isocyanurate) | 0.51 | 4.32 | 9.13 | 2.74 | 0.98 | 3.03 | 3.03 | 0.35 | 0.24 |
| | Anti-Aging Agent | 2.01 | 2.01 | 2.01 | 2.01 | 2.01 | 2.01 | 2.01 | 2.01 | 2.01 |
| | SEBS | 100 | 100 | 100 | 100 | 100 | 100 | 100 | 100 | 100 |
| | Paraffinic Oil | 333.3 | 333.3 | 333.3 | 333.3 | 333.3 | 333.3 | 333.3 | 333.3 | 333.3 |
| | HDPE | 66.7 | 66.7 | 66.7 | 66.7 | 66.7 | 66.7 | 66.7 | 66.7 | 66.7 |
| | EBM | 66.7 | 66.7 | 66.7 | 66.7 | 66.7 | 66.7 | 66.7 | 66.7 | 66.7 |
| | Total Amount | 669.3 | 673.1 | 677.9 | 671.5 | 669.8 | 671.8 | 671.8 | 669.1 | 669.0 |
| Evaluation of Composition Characteristics | Compression Set [Unit: %] | 61 | 58 | 61 | 52 | 56 | 50 | 50 | 46 | 47 |
| | MFR [Unit: g/10 min] | Excessive | Excessive | Excessive | Excessive | Excessive | 186 | 135 | 35 | 106 |

Examples 10 to 11 and Comparative Examples 10 to 12

The resin compositions were produced by employing the same steps as the "Step of Producing Resin Composition" employed in Examples 1 to 9 and Comparative Examples 1 to 9 described above except that pentaerythritol (manufactured by The Nippon Synthetic Chemical Industry Co., Ltd. under the trade name "Neurizer P") was used as the cross-linking agent instead of tris (2-hydroxyethyl) isocyanurate and the amount of each ingredient used was adjusted so that the composition (parts by mass) would have the composition presented in Table 4 (note that in each of the Examples and Comparative Examples, the amount of the maleic anhydride-modified thermoplastic resin used was 8 g). Table 4 presents the measured values of the characteristics (MFR and C-Set) of the resin compositions obtained as above in Examples and Comparative Examples (note that for those with an MFR of 300 g/10 min or more, the MFR is indicated as "Excessive"). In addition, the contents of the items "Evaluation of Maleation Rate" and "Evaluation of Melting Point" are as described above.

TABLE 4

| | | Example 10 | Example 11 | Comparative Example 10 | Comparative Example 11 | Comparative Example 12 |
|---|---|---|---|---|---|---|
| Maleic Anhydride-Modified Thermoplastic Resin | Type | TP(1) | TP(2) | TP(10) | TP(13) | TP(17) |
| | Evaluation of Maleation Rate | S | S | F | F | F |
| | Evaluation of Melting Point | S | S | F | F | S |
| Composition [Parts by Mass] | Maleic Anhydride-Modified Thermoplastic Resin | 100 | 100 | 100 | 100 | 100 |
| | Clay | 0.1 | 0.1 | 0.1 | 0.1 | 0.1 |
| | Cross-Linking Agent (Pentaerythritol) | 0.34 | 0.38 | 0.20 | 1.07 | 0.14 |
| | Anti-Aging Agent | 2.01 | 2.01 | 2.01 | 2.01 | 2.01 |
| | SEBS | 100 | 100 | 100 | 100 | 100 |
| | Paraffinic Oil | 333.3 | 333.3 | 333.3 | 333.3 | 333.3 |
| | HDPE | 66.7 | 66.7 | 66.7 | 66.7 | 66.7 |
| | EBM | 66.7 | 66.7 | 66.7 | 66.7 | 66.7 |
| | Total Amount | 669.2 | 669.2 | 669.0 | 669.9 | 668.9 |

TABLE 4-continued

|  |  | Example 10 | Example 11 | Comparative Example 10 | Comparative Example 11 | Comparative Example 12 |
|---|---|---|---|---|---|---|
| Evaluation of Composition Characteristics | Compression Set [Unit: %] | 36 | 40 | 62 | 59 | 47 |
|  | MFR [Unit: g/10 min] | 29 | 22 | Excessive | Excessive | 26 |

Examples 12 and 13 and Comparative Examples 13 to 15

The resin compositions were produced by employing the same steps as the "Step of Producing Resin Composition" employed in Examples 1 to 9 and Comparative Examples 1 to 9 described above except that 2,4-diamino-6-phenyl-1,3,5-triazine (manufactured by Nippon Shokubai Co., Ltd. under the trade name "Benzoguanamine") was used as the cross-linking agent instead of tris (2-hydroxyethyl) isocyanurate and the amount of each ingredient used was adjusted so that the composition (parts by mass) would have the composition presented in Table 5 (note that in each of the Examples and Comparative Examples, the amount of the maleic anhydride-modified thermoplastic resin used was 8 g). Table 5 presents the measured values of the characteristics (MFR and C-Set) of the resin compositions obtained as above in Examples and Comparative Examples (note that for those with an MFR of 300 g/10 min or more, the MFR is indicated as "Excessive"). In addition, the contents of the items "Evaluation of Maleation Rate" and "Evaluation of Melting Point" are as described above.

by mass had a compression set (C-Set) in the range of 43% or less and a melt flow rate (MFR) in the range of 10 to 200 g/10 min. As above, the resin compositions obtained in Examples 1 to 13 not only had a compression set of 43% or less and a sufficiently high level of resistance to compression set, but also had excellent fluidity capable of sufficiently ensuring workability as a resin composition because the melt flow rate (MFR), which is an index of fluidity, was in the range of 10 to 200 g/10 min. Hence, the characteristics of both resistance to compression set and fluidity were achieved at a high level. Note that when the compression set (C-Set) is in the range of 43% or less, the molded product obtained from the composition is one whose deformation is sufficiently suppressed even after long-term use, and it can be said that the molded product is excellent in shape retention and resilience. In addition, when the melt flow rate (MFR) is less than 10 g/10 min, the fluidity is too low, and it becomes difficult to use a molding method such as injection molding at the time of molding, and workability such as molding cannot be sufficiently obtained. Meanwhile, when the MFR exceeds 200 g/10 min, the fluidity becomes too high, and the workability disadvantageously is lowered

TABLE 5

|  |  | Example 12 | Example 13 | Comparative Example 13 | Comparative Example 14 | Comparative Example 15 |
|---|---|---|---|---|---|---|
| Maleic Anhydride-Modified Thermoplastic Resin | Type | TP(1) | TP(2) | TP(10) | TP(13) | TP(17) |
|  | Evaluation of Maleation Rate | S | S | F | F | F |
|  | Evaluation of Melting Point | S | S | F | F | S |
| Composition (Parts by Mass) | Maleic Anhydride-Modified Thermoplastic Resin | 100 | 100 | 100 | 100 | 100 |
|  | Clay | 0.1 | 0.1 | 0.1 | 0.1 | 0.1 |
|  | Cross-Linking Agent (2,4-diamino-6-phenyl-1,3,5-triazine) | 0.95 | 1.05 | 0.55 | 2.95 | 0.38 |
|  | Anti-Aging Agent | 2.01 | 2.01 | 2.01 | 2.01 | 2.01 |
|  | SEBS | 100 | 100 | 100 | 100 | 100 |
|  | Paraffinic Oil | 333.3 | 333.3 | 333.3 | 333.3 | 333.3 |
|  | HDPE | 66.7 | 66.7 | 66.7 | 66.7 | 66.7 |
|  | EBM | 66.7 | 66.7 | 66.7 | 66.7 | 66.7 |
|  | Total Amount | 669.8 | 669.9 | 669.4 | 671.8 | 669.2 |
| Evaluation of Composition Characteristics | Compression Set [Unit: %] | 38 | 39 | 63 | 60 | 48 |
|  | MFR [Unit: g/10 min] | 33 | 21 | Excessive | Excessive | 24 |

As is apparent from the results presented in Tables 2 to 5, all of the resin compositions (Examples 1 to 13) containing a reaction product of a cross-linking agent with a maleic anhydride-modified thermoplastic resin having a melting point of 68° C. to 134° C. and a maleation rate of 0.5 to 2.5% and the extrusion molding cannot be sufficiently performed. Therefore, it can be said that a resin composition having a compression set of 43% or less and a melt flow rate (MFR) in the range of 10 to 200 g/10 min is excellent in the characteristics of both resistance to compression set and fluidity. Note that it is apparent all of the reaction products of a cross-linking agent with a maleic anhydride-modified thermoplastic resin contained in the resin composition obtained in each Example have a glass transition point of 25° C. or lower based on the type of resin serving as the main chain (HDPE or LLDPE) and the glass transition point of the maleic anhydride-modified thermoplastic resin (see Table 1).

On the other hand, in the resin compositions (Comparative Examples 1 to 15) containing a reaction product of a cross-linking agent with a maleic anhydride-modified thermoplastic resin that does not satisfy either or both of the condition that the melting point is in the range of 68° C. to 134° C. (hereinafter referred to as the "condition (I)") and the condition that the maleation rate is in the range of 0.5 to 2.5% by mass (hereinafter referred to as the "condition (II)"), the melt flow rate (MFR) could not be in the range of 10 to 200 g/10 min while the compression set of the composition was set to 43% or less. As describe above, in the resin compositions containing a reaction product of a cross-linking agent with a maleic anhydride-modified thermoplastic resin that does not satisfy either or both of the condition (I) and the condition (II), the characteristics of resistance to compression set and fluidity could not be made sufficiently good, and these characteristics could not be compatible with each other.

INDUSTRIAL APPLICABILITY

As has been described above, the present invention makes it possible to provide a resin composition capable of achieving both two sufficiently good characteristics of resistance to compression set and fluidity. Therefore, the resin composition of the present invention is particularly useful as a material for producing a resin product used for applications such as daily necessities, automobile parts, electric appliances, and industrial parts.

The invention claimed is:

1. A resin composition comprising:
at least one resin ingredient selected from the group consisting of a resin (A) having a side chain (a) containing a hydrogen-bonding cross-linking moiety with a carbonyl-containing group and/or a nitrogen-containing heterocycle and having a glass transition point of 25° C. or lower, and a resin (B) containing a hydrogen-bonding cross-linking moiety and a covalent-bonding cross-linking moiety in a side chain and having a glass transition point of 25° C. or lower, wherein both the resin (A) and the resin (B) are a reaction product of a cross-linking agent with a maleic anhydride-modified thermoplastic resin having a melting point of 68° C. to 134° C. and a maleation rate of 0.5 to 2.5% by mass.

2. The resin composition according to claim 1, wherein the cross-linking agent is a compound having at least one of a hydroxyl group, an amino group, an imino group, and a thiol group.

3. The resin composition according to claim 1, wherein the maleic anhydride-modified thermoplastic resin is a polyolefin-based resin modified with maleic anhydride.

4. The resin composition according to claim 3, wherein the polyolefin-based resin modified with maleic anhydride is a high density polyethylene modified with maleic anhydride.

* * * * *